United States Patent [19]

Ko et al.

[11] Patent Number: 5,910,566

[45] Date of Patent: Jun. 8, 1999

[54] LIVING POLYMER HYDROGENATION CATALYST AND PROCESS FOR HYDROGENATING POLYMERS WITH THE CATALYST

[75] Inventors: Young Hoon Ko; Jae Yun Kim; Jin Man Hwang, all of Taejeon, Rep. of Korea

[73] Assignee: Korea Kumho Petrochemical Co., Ltd., Seoul, Rep. of Korea

[21] Appl. No.: 09/013,230

[22] Filed: Jan. 26, 1998

[30] Foreign Application Priority Data

Jul. 24, 1997 [KR] Rep. of Korea ............... 97-34736

[51] Int. Cl.⁶ ............ B01J 31/00; B01J 27/24; B01J 23/00

[52] U.S. Cl. .......... 528/480; 528/482; 528/491; 528/492; 528/494; 528/497; 528/503; 502/152; 502/155; 502/171; 502/200; 502/309; 502/349; 502/350

[58] Field of Search ............ 502/152, 155, 502/171, 200, 308, 309, 349, 350; 528/480, 482, 490, 491, 492, 494, 497, 503

[56] References Cited

U.S. PATENT DOCUMENTS

| | | |
|---|---|---|
| 3,670,054 | 6/1972 | De La Mare et al. |
| 3,700,633 | 10/1972 | Wald et al. |
| 4,501,857 | 2/1985 | Kishimoto et al. ............ 525/338 |
| 4,673,714 | 6/1987 | Kishimoto et al. ............ 525/314 |
| 4,980,421 | 12/1990 | Teramoto et al. ............ 525/338 |
| 5,039,755 | 8/1991 | Chamberlain et al. ............ 525/338 |

Primary Examiner—Nathan M. Nutter
Attorney, Agent, or Firm—Kenyon & Kenyon

[57] ABSTRACT

This invention is to provide a process for the hydrogenation of conjugated diene polymer in an inert organic solvent, said polymer being obtained by polymerization or copolymerization of a conjugated diene, which comprise effecting selective hydrogenation of unsaturated double bonds in the conjugated diene units of said conjugated diene polymer in the presence of catalyst represented by the following formula (I)

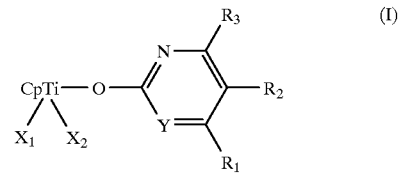

wherein

Cp is cyclopentadienyl ($C_5H-$);

$X_1$ and $X_2$ are each independently a hologen atom, such as, chlorine or bromine;

Y is carbon or nitrogen atom; and $R_1$, $R_2$ and $R_3$ are each independently hydrogen atom or $C_1-C_4$ lower alkyls.

7 Claims, No Drawings

LIVING POLYMER HYDROGENATION CATALYST AND PROCESS FOR HYDROGENATING POLYMERS WITH THE CATALYST

BACKGROUND OF THE INVENTION

1. Field of the Invention

The present invention relates to a highly active homogeneous organic titanium catalyst used for selective hydrogenation of unsaturated double bonds in conjugated diene units of the living polymer, and a process for hydrogenating the polymer.

2. Description of the Prior Art

Polymers obtained by subjecting a conjugated diene to polymerization or copolymerization are widely used as an elastomer in industry. These polymers have the remaining unsaturated double bonds in the polymer chain, which are advantageously utilized in vulcanization on one hand, but render the polymers poor in stability such as weather resistance and oxidation resistance. Block copolymers obtained from conjugated diene and vinyl-substituted aromatic hydrocarbon are used in the unvulcanized state as a thermoplastic elastomer, a transparent impact-resistance resin or a modifier for styrene resins and olefin resins. However, these copolymers are inferior in weather resistance, oxidation resistance and ozone resistance because of the unsaturated double bonds remaining in the polymer chain, which makes the copolymers unsuitable for use in the field of outer-coating materials.

Generally, the improvement of weather resistance and oxidation resistance can be accomplished by hydrogenating the polymers to saturate the unsaturated double bonds remaining in the polymer chain. Many processes have been reported for hydrogenating polymers having unsaturated double bonds. In general, there are two known processes. Namely, a process using heterogeneous system catalyst and a process using homogeneous system; Ziegler type or organic complex catalyst, such as, an organometallic compound of Rh or Ti.

In the process using the heterogenous system, the hydrogenation reaction is caused by the contact of hydrogen with polymer on the heterogeneous catalyst. Therefore, it becomes difficult for the reactants to contact with the catalyst owing to the viscosity of the reaction system and steric hindrance of polymer chain. Hence, a large amount of the catalyst and more severe conditions are required for the efficient hydrogenation of polymer. As a result, it causes the decomposition and gelation of polymer. In the case of hydrogenation of the copolymer of conjugated diene and vinyl substituted aromatic hydrocarbon, the aromatic nucleus portions of the copolymer are usually hydrogenated, and it is difficult to selectively hydrogenate only the unsaturated double bond of the conjugated diene units. Furthermore, the physical removal of the catalyst after hydrogenation from the hydrogenated polymer is difficult and complete removal is substantially impossible.

On the other hand, in the process using the homogeneous catalyst system, the catalytic activity is high and the hydrogenation can be carried out under mild conditions. Therefore, it is possible to selectively hydrogenate the unsaturated double bonds of the conjugated diene units in the copolymer of conjugated diene and vinyl substituted aromatic hydrocarbon.

The hydrogenation or selective hydrogenation of conjugated diene polymers has been accomplished using any of the several hydrogenation processes known in the prior art, for example, U.S. Pat. Nos. 3,494,942; 3,670,054; 3,700,633. These methods known in the prior art for hydrogenating polymers containing ethylene unsaturation and for hydrogenating or selectively hydrogenating polymers containing aromatic and ethylene unsaturation involve the use of a suitable catalyst, particularly, a catalyst or catalyst precusor comprising a Group VIII metal.

In the methods described in foregoing patents, a catalyst is prepared by combining a Group VIII metal, particularly nickel or cobalt, compound with a suitable reducing agent such as aluminum alkyl. Also, while aluminum alkyls are the preferred reducing agents, it is known in the prior art that alkyls and hybrids of metals of Groups I-A, II-A and III-B of the Periodic Table of the Elements are effetive reducing agents, particularly lithium, magnesium and aluminum. In general, the Group VIII metal compound is combined with Group I-A, II-A or III-B metal alkyl or hybride at a concentration sufficient to provide Group I-A, II-A and/or III-B metal to Group VIII metal ratio within the range from about 0.1:1 to about 20:1, preferably from about 1:1 to about 10:1.

U.S. Pat. No. 4,501,857 disclosed that selective hydrogenation of the unsaturated double bonds in conjugated diolefin polymers could be achieved by hydrogenating such polymers in the presence of at least one bis(cyclopentadienyl)-titanium compound and at least one hydrocarbon lithium compound. Also, U.S. Pat. No. 4,980,421 disclosed that similar hydrogenation can be accomplished with the same titanium compounds in combination with an alkoxy lithium compound which can either be added directly or as a reaction mixture of an organo lithium compound with an alcoholic or phenolic compound. The use of these catalyst systems was said to be advantageous, because the catalysts were said to be highly active so that they were effective even in such a small amount as not to affect adversely the stability of a hydrogenated polymer and require no deashing step.

In U.S. Pat No. 4,673,714, bis(cyclopentadienyl)-titanium compounds were disclosed which preferentially hydrogenate the unsaturated double bonds of conjugated diolefins but do not require the use of an alkyl lithium compound. These titanium compounds were bis(cyclopentadienyl) titanium diaryl compounds. The elimination of the need for the hydrocarbon lithium compound was said to be a significant advantage of this invention.

In U.S. Pat. No. 5,039,755, the process for hydrogenation of conjugated diolefin polymer which comprises polymerizing or copolymerizing at least one conjugated diolefin with an organo alkali metal polymerization initiator in a suitable solvent thereby creating a living polymer. The living polymer was terminated by the addition of hydrogen. The selective hydrogenation was carried out in the presence of at least one bis(cyclopentadienyl) titanium compound preferably of the formular $(C_5H_5)Ti\ R_1\ R_2$.

However, in the case of the homogenous catalyst, the hydrogenation activity is greatly varied depending upon the reduction state of catalysts, and therefore, the reproducibility of hydrogenation is inferior and it is difficult to obtain the hydrogenated polymer having a high degree of hydrogenation with a high reproducibility. Moreover, the catalyst components tend to be converted into inactive substance owing to impurities. Therfore, the impurities decline the hydrogenation activity and reproducibility. The fact that highly hydrogenated polymer cannot be obtained due to its low reproducibility is a great obstacle to utilize the homogeneous catalytic hydrogenation for the purpose of enhancing the weather resistance and heat resistance of the polymers. Further, in the conventional hydrogenation of polymers with homogeneous catalyst, the hydrogenation rate cannot be said to be sufficiently high. Therefore, it has been a problem in hydrogenating the polymer with a homogenous catalyst in industry. With these reasons, it has been strongly desired that there is developed a highly active hydrogenation catalyst which is capable of producing the highly hydrogenated polymer at a high hydrogenation rate stably.

SUMMARY OF THE INVENTION

The object of this invention is to provide a process for the hydrogenation of conjugated diene polymer in an inert organic solvent, said polymer being obtained by polymerization or copolymerization of a conjugated diene, which comprise effecting selective hydrogenation of unsaturated double bonds in the conjugated diene units of said conjugated diene polymer in the presence of catalyst represented by the following formula (I)

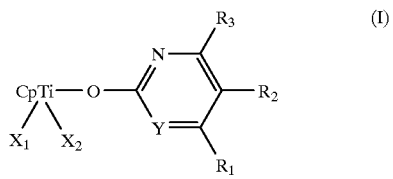

wherein

Cp is cyclopentadienyl ($C_5H_5$—);

$X_1$ and $X_2$ are each independently a hologen atom, such as, chlorine or bromine;

Y is carbon or nitrogen atom; and $R_1$, $R_2$ and $R_3$ are each independently hydrogen atom or $C_1$–$C_4$ lower alkyls.

The preferable catalyst compound among the above compound of formula (I) is [Y:carbon atom, $R_1$ and $R_2$:hydrogen atom, and $R_3$:hydrogen atom or methyl] or [Y:nitrogen atom, $R_1$:hydrogen atom or methyl, $R_2$:hydrogen atom, and $R_3$:hydrogen atom or methyl].

DETAILED DESCRIPTION OF THE INVENTION

The polymer used in the hydrogenation in this invention has generally a molecular weight of about 500 to about 1,000,000, and may be a conjugated diene living polymer, a living copolymer of vinyl-substituted aromatic monomers and conjugated diene or a random or block copolymer having unsaturated double bonds in conjugated diene units.

As is well known, polymers containing both aromatic and ethylenic unsaturation can be prepared by copolymerizing one or more polyolefins, particularly a diolefin, by themselves or with one or more alkenyl aromatic hydrocarbon monomers. The copolymers may, of course, be random, tapered, block or a combination of these, as well as linear, star or radial.

As is well known, polymers containing ethylenic unsaturation or both aromatic and ethylenic unsaturation may be prepared using anionic initiators or polymerization catalysts. Such polymers may be prepared using bulk, solution or emulsion techniques. In any case, the polymer containing at least ethylenic unsaturation will, generally, be recovered as a solid such as a crumb, a powder, a pellet or the like. Polymers containing ethylenic unsaturation and polymers containing both aromatic and ethylenic unsaturation are, of course, available commercially from several suppliers.

Conjugated dienes which may be polymerized anionically include those conjugated diolefins containing from 4 to about 12 carbon atoms such as 1,3-butadiene, isoprene, piperylene, phenylbutadiene, 3,4-dimethyl-1,3-hexadiene, 4,5-diethyl-1,3-octadiene and the like. Conjugated dienes containing from 4 to about 9 carbon atoms are preferred for use in such polymers. Alkenyl aromatic hydrocarbons which may be copolymerized include vinyl aryl compounds such as styrene, various alkyl-substituted styrenes, alkoxy-substituted styrenes, 2-vinyl pyridine, 4-vinyl pyridine, vinyl naphthalene, alkyl-substituted vinyl naphthalenes and the like.

In this invention, the hydrogenation reaction is preferably effected in a living polymer solution of a conjugated diene polymer in an inert organic solvent. The inert organic solvent means a solvent which does not react with any of the materials used in the hydrogenation reactions. The solvent is preferably an aliphatic hydrocarbon such as n-pentane, n-hexane, n-heptane, n-octane or the like: an alicyclic hydrocarbon such as cyclopentane, cyclohexane, cycloheptane or the like: or an ether such as diethyl ether, tetrahydrofuran or the like, and these may be used alone or in combination of two or more. Also, aromatic hydrocarbons such as benzene, toluene, xylene and ethylbenzene may be used only when the aromatic double bonds are not hydrogenated under the selected hydrogenation conditions.

The hydrogenation is effected at a concentration of the living polymer of 1 to 50% by weight, preferably 5 to 25% by weight based on the weight of the solvent, and it is essential that the living polymer subjected to the hydrogenation should retain lithium intact and should not be totally inactivated by water or some other contaminant matter present in the solvent.

The hydrogenation reaction of this invention is generally carried out by keeping the above living polymer solution at the desired temperature under inert atmosphere, adding a hydrogenation catalyst thereto with or without stirring and subsequently introducing a hydrogen gas thereinto to reach the desired pressure. The inert atmosphere means an atmosphere which does not react with any of the materials used in the hydrogenation, and includes, for example, nitrogen, neon, argon and the like. Air and oxygen should not be used because they oxydize the catalyst to deactivate it.

The catalyst of the present invention is prepared by the following process: i) reacting hydroxypyridine derivative or hydroxypyrimidine derivative with n-butyl lithium (1:1) in a suitable solvent, and ii) reacting said intermediate material with organotitanium compound in the same ratio. In the living polymer, the present amount of Li/Ti is preferably 2:1~10:1. And the amount of hydrogenation catalyst added is 0.1~5 mmole, per 100 g of living polymer. Therefore, small amount of catalyst is required for hydrogenation. In case of excess amount of reducing Li, the amount of Li is adjusted by the treatment of alcohol.

The hydrogenation reaction is generally conducted at 0° to 150° C. When the temperature is lower than 0° C., the catalyst activity is reduced and the hydrogenation speed is low and requires a large amount of catalyst. The temperature of less than 0° C. is not economical. When the temperature is higher than 150° C., side reactions, decomposition and gelation are liable to take place and even the hydrogenation of the aromatic nucleus portions tends to occur, and the selectivity of hydrogenation is reduced. Thus, the temperature of more than 150° C. is not desirable. The hydrogenation temperature is more preferably 50° to 140° C.

The pressure of hydrogen used in the hydrogenation is preferably 1 to 100 kg/cm². When the pressure is lower than 1 kg/cm², the hydrogenation speed is low and substantially no hydrogenation proceeds. Therefore, it is difficult to increase hydrogenation percentage. When the pressure is higher than 100 kg/cm², the hydrogenation is almost complete at the same time when the pressure is elevated to such a value, and hence such a higher pressure is substantially insignificant. Further, side reactions and gelation which are unfavorable take place. The pressure of hydrogen used in the hydrogenation is more preferably 2 to 30 kg/cm². An optimum hydrogen pressure is selected in relation to parameters such as the amount of catalyst added and the like.

In this invention, the hydrogenation time usually ranges from several seconds to 500 hours. The hydrogenation time can appropriately be selected within the range depending upon other hydrogenation conditions adopted.

The hydrogenation catalyst of this invention enables quantitative hydrogenation of olefinically unsaturated double bonds by proper selection of hydrogenation conditions. The catalyst further enables hydrogenation of such double bonds to a desired hydrogenation level. In the hydrogenation of a polymer, a hydrogenated polymer can be obtained wherein at least 50%, preferably at least 90%, of the unsaturated double bonds of the conjugated diene units of the original polymer has been hydrogenated. In the hydrogenation of a copolymer of a conjugated diene and a vinyl-substituted aromatic hydrocarbon, a hydrogenated copolymer can be obtained wherein at least 50%, preferably at least 90%, of the unsaturated double bonds of the conjugated diene units of the original copolymer have been selectively hydrogenated.

As stated above, the novel hydrogenation catalyst of this invention enables efficient hydrogenation of olefinically unsaturated double bonds, particularly (1) hydrogenation of a conjugated diene polymer under mild conditions using a highly active catalyst and (2) highly preferential hydrogenation of the unsaturated double bonds of the conjugated diene units of a copolymer of a conjugated diene and a viny-substituted aromatic hydrocarbon.

Hereinunder, this invention will be explained in detail referring to Examples. However, this invention should not be interpreted to be restricted to the Examples.

REFERENCE EXAMPLE 1

Synthesis of Hydrogenation Catalyst 200 ml of round flask was purged with an inert gas and 20 ml of toluene was poured in the flask. 0.86 g(8 mmole) of 2-hydroxy pyridine and 6.15 ml of n-butyl lithium dissolved in 1.3 M of cyclohexane were reacted for 30 minutes at room temperature. Then, 80 ml of cyclopentadienyl titanium trichloride dissolved in 0.1 M toluene was added and reacted with obtained material for 1 hour at room temperature. The yield of synthesized catalyst [$CpTiCl_2(-OC_5NH_4)$] is 95%.

$^1$H-NMR($CDCl_3$, ppm); $\delta(C_5H_5):6.627(s,5H)$, $\delta(-OC_5NH_4):6.779\sim6.901(m,4H)$

REFERENCE EXAMPLE 2

Synthesis of Hydrogenation Catalyst 200 ml of round flask was purged with an inert gas and 20 ml of toluene was poured in the flask. 0.87 g(8 mmole) of 2-hydroxy-6-methyl pyridine and 6.15 ml of n-butyl lithium dissolved in 1.3 M of cyclohexane were reacted for 30 minutes at room temperature. Then, 80 ml of cyclopentadienyl titanium trichloride dissolved in 0.1 M toluene was added and reacted with obtained material for 1 hour at room temperature. The yield of synthesized catalyst [$CpTiCl_2(-OC_6NH_6)$] is 90%.

$^1$H-NMR($CDCl_3$, ppm); $\delta(C_5H_5):6.802(s,5H)$, $\delta(-OC_6NH_3):6.118(d,1H)$, $6.383(d,1H)$, $7.241(m,1H)$, $\delta(-CH_3):2.116(s,3H)$

REFERENCE EXAMPLE 3

Synthesis of Hydrogenation Catalyst 200 ml of round flask was purged with an inert gas and 20 ml of toluene was poured in the flask. 0.99 g(8 mmole) of 4,6-dimethy-2-hydroxy pyrimidine and 6.15 ml of n-butyl lithium dissolved in 1.3 M of cyclohexane were reacted for 30 minutes at room temperature. Then, 80 ml of cyclopentadienyl titanium trichloride dissolved in 0.1 M toluene was added and reacted with obtained material for 1 hour at room temperature. The yield of synthesized catalyst [$CpTiCl_2(-OC_6N_2H_7)$] is 90%.

$^1$H-NMR(DMSO, ppm); $\delta(C_5H_5):6.692(s,5H)$, $\delta(-OC_4N_2H):6.256(s,1H)$, $\delta(-CH_3):2.235(s,6H)$

REFERENCE EXAMPLE 4

Synthesis of Living Polymer

In a 2 gallon autoclave were placed 4500 g of cyclohexane, 9 g of tetrahydrofuran, 112.5 g of styrene and 15 mmole of n-buthyllithium. The resulting mixture was subjected to polymerization for 30 minutes. Then, 525 g of 1,3-butadiene was added and polymerization was conducted for 1 hour. Finally, 112.5 g of styrene was added and polymerization was conducted for 30 minutes. The polymer obtained was a styrene-butadiene-styrene living block copolymer having a bond styrene content of 30.2%, a block styene content of 29.9% and a 1.2-vinyl content in the butadiene units of 38.5% (26.9% based on the weight of the entire copolymer) and having a number average molecular weight of about 50,000. The amount of living lithium in this polymer was 2.0 mmole per 100 g of living polymer.

REFERENCE EXAMPLE 5

Synthesis of Living Polymer

In a 2 gallon autoclave were placed 4500 g of cyclohexane, 9 g of tetrahydrofuran, 112.5 g of styrene and 12.5 mmole of n-buthyllithium. The resulting mixture was subjected to polymerization for 20 minutes. Then, 525 g of 1,3-butadiene was added and polymerization was conducted for 1 hour. Finally, 112.5 g of styrene was added and polymerization was conducted for 30 minutes. The polymer obtained was a styrene-butadiene-styrene living block copolymer having a bond styrene content of 30.1%, a block styene content of 30.0% and a 1.2-vinyl content in the butadiene units of 40.4% (28.0% based on the weight of the entire copolymer) and having a number average molecular weight of about 60,000. The amount of living lithium in this polymer was 1.6 mmole per 100 g of living polymer.

REFERENCE EXAMPLE 6

Synthesis of Living Polymer

In a 2 gallon autoclave were placed 4500 g of cyclohexane, 9 g of tetrahydrofuran, 112.5 g of styrene and 18.75 mmole of n-buthyllithium. The resulting mixture was subjected to polymerization for 30 minutes. Then, 525 g of 1,3-butadiene was added and polymerization was conducted for 1 hour. Finally, 112.5 g of styrene was added and polymerization was conducted for 30 minutes. The polymer obtained was a styrene-butadiene-styrene living block copolymer having a bond styrene content of 29.9%, a block styene content of 29.8% and a 1.2-vinyl content in the butadiene units of 39.5% (27.7% based on the weight of the entire copolymer) and having a number average molecular weight of about 40,000. The amount of living lithium in this polymer was 2.5 mmole per 100 g of living polymer.

REFERENCE EXAMPLE 7

Synthesis of Living Polymer

In a 2 gallon autoclave were placed 4500 g of cyclohexane, 9 g of tetrahydrofuran, 112.5 g of styrene and 10.7 mmole of n-buthyllithium. The resulting mixture was subjected to polymerization for 30 minutes. Then, 525 g of 1,3-butadiene was added and polymerization was conducted for 1 hour. Finally, 112.5 g of styrene was added and polymerization was conducted for 30 minutes. The polymer obtained was a styrene-butadiene-styrene living block copolymer having a bond styrene content of 29.8%, a block styene content of 29.8% and a 1.2-vinyl content in the butadiene units of 37.8% (26.5% based on the weight of the entire copolymer) and having a number average molecular weight of about 70,000. The amount of living lithium in this polymer was 1.4 mmole per 100 g of living polymer.

EXAMPLE 1

Hydrogenation of Living Polymer

Into a 1 gallon autoclave was charged with 1400 g of polymer solution containing the 200 g of polymer obtained in Reference Example 4, and the solution was heated and maintained at 80° C. with stirring at 500 rpm. Subsequently, 0.8 mmole of catalyst obtained in Reference Example 1 was added to the polymer solution. Then, dried hydrogen gas was fed into the autoclave at a pressure of 10 kg/cm$^2$ and the mixture was stirred for 3 hours to hydrogenate the polymer. The reaction solution was relieved of heat and pressure, removed from the autoclave, and diluted with a large volume of methanol to precipitate the polymer in the solution. The precipitated polymer was separated from the solution by filtration and dried. By the H-NMR analysis, the degree of hydrogenation of olefinic double bonds was 99.4% and no styrene unit was hydrogenated.

EXAMPLE 2

Hydrogenation of Living Polymer

Into a 1 gallon autoclave was charged with 1400 g of polymer solution containing the 200 g of polymer obtained in Reference Example 4, and the solution was heated and maintained at 80° C. with stirring at 500 rpm. Subsequently, 0.8 mmole of catalyst obtained in Reference Example 2 was added to the polymer solution. Then, dried hydrogen gas was fed into the autoclave at a pressure of 10 kg/cm$^2$ and the mixture was stirred for 3 hours to hydrogenate the polymer. The reaction solution was relieved of heat and pressure, removed from the autoclave, and diluted with a large volume of methanol to precipitate the polymer in the solution. The precipitated polymer was separated from the solution by filtration and dried. By the H-NMR analysis, the degree of hydrogenation of olefinic double bonds was 99.7% and no styrene unit was hydrogenated.

EXAMPLE 3

Hydrogenation of Living Polymer

Into a 1 gallon autoclave was charged with 1400 g of polymer solution containing the 200 g of polymer obtained in Reference Example 4, and the solution was heated and maintained at 80° C. with stirring at 500 rpm. Subsequently, 0.8 mmole of catalyst obtained in Reference Example 3 was added to the polymer solution. Then, dried hydrogen gas was fed into the autoclave at a pressure of 10 kg/cm$^2$ and the mixture was stirred for 3 hours to hydrogenate the polymer. The reaction solution was relieved of heat and pressure, removed from the autoclave, and diluted with a large volume of methanol to precipitate the polymer in the solution. The precipitated polymer was separated from the solution by filtration and dried. By the H-NMR analysis, the degree of hydrogenation of olefinic double bonds was 99% and no styrene unit was hydrogenated.

EXAMPLE 4

Hydrogenation of Living Polymer

Into a 1 gallon autoclave was charged with 1400 g of polymer solution containing the 200 g of polymer obtained in Reference Example 5, and the solution was heated and maintained at 80° C. with stirring at 500 rpm. Subsequently, 0.8 mmole of catalyst obtained in Reference Example 1 was added to the polymer solution. Then, dried hydrogen gas was fed into the autoclave at a pressure of 10 kg/cm$^2$ and the mixture was stirred for 3 hours to hydrogenate the polymer. The reaction solution was relieved of heat and pressure, removed from the autoclave, and diluted with a large volume of methanol to precipitate the polymer in the solution. The precipitated polymer was separated from the solution by filtration and dried. By the H-NMR analysis, the degree of hydrogenation of olefinic double bonds was 99.2% and no styrene unit was hydrogenated.

EXAMPLE 5

Hydrogenation of Living Polymer

Into a 1 gallon autoclave was charged with 1400 g of polymer solution containing the 200 g of polymer obtained in Reference Example 5, and the solution was heated and maintained at 80° C. with stirring at 500 rpm. Subsequently, 0.8 mmole of catalyst obtained in Reference Example 2 was added to the polymer solution. Then, dried hydrogen gas was fed into the autoclave at a pressure of 10 kg/cm$^2$ and the mixture was stirred for 3 hours to hydrogenate the polymer. The reaction solution was relieved of heat and pressure, removed from the autoclave, and diluted with a large volume of methanol to precipitate the polymer in the solution. The precipitated polymer was separated from the solution by filtration and dried. By the H-NMR analysis, the degree of hydrogenation of olefinic double bonds was 99.5% and no styrene unit was hydrogenated.

EXAMPLE 6

Hydrogenation of Living Polymer

Into a 1 gallon autoclave was charged with 1400 g of polymer solution containing the 200 g of polymer obtained in Reference Example 5, and the solution was heated and maintained at 80° C. with stirring at 500 rpm. Subsequently, 0.8 mmole of catalyst obtained in Reference Example 3 was added to the polymer solution. Then, dried hydrogen gas was fed into the autoclave at a pressure of 10 kg/cm$^2$ and the mixture was stirred for 3 hours to hydrogenate the polymer. The reaction solution was relieved of heat and pressure, removed from the autoclave, and diluted with a large volume of methanol to precipitate the polymer in the solution. The precipitated polymer was separated from the solution by filtration and dried. By the H-NMR analysis, the degree of hydrogenation of olefinic double bonds was 99.9% and no styrene unit was hydrogenated.

EXAMPLE 7

Hydrogenation of Living Polymer

Into a 1 gallon autoclave was charged with 1400 g of polymer solution containing the 200 g of polymer obtained in Reference Example 6, and the solution was heated and maintained at 80° C. with stirring at 500 rpm. Subsequently, 0.8 mmole of catalyst obtained in Reference Example 1 was added to the polymer solution. Then, dried hydrogen gas was fed into the autoclave at a pressure of 10 kg/cm² and the mixture was stirred for 3 hours to hydrogenate the polymer. The reaction solution was relieved of heat and pressure, removed from the autoclave, and diluted with a large volume of methanol to precipitate the polymer in the solution. The precipitated polymer was separated from the solution by filtration and dried. By the H-NMR analysis, the degree of hydrogenation of olefinic double bonds was 99.1% and no styrene unit was hydrogenated.

EXAMPLE 8

Hydrogenation of Living Polymer

Into a 1 gallon autoclave was charged with 1400 g of polymer solution containing the 200 g of polymer obtained in Reference Example 6, and the solution was heated and maintained at 80° C. with stirring at 500 rpm. Subsequently, 0.8 mmole of catalyst obtained in Reference Example 2 was added to the polymer solution. Then, dried hydrogen gas was fed into the autoclave at a pressure of 10 kg/cm² and the mixture was stirred for 3 hours to hydrogenate the polymer. The reaction solution was relieved of heat and pressure, removed from the autoclave, and diluted with a large volume of methanol to precipitate the polymer in the solution. The precipitated polymer was separated from the solution by filtration and dried. By the H-NMR analysis, the degree of hydrogenation of olefinic double bonds was 99.3% and no styrene unit was hydrogenated.

EXAMPLE 9

Hydrogenation of Living Polymer

Into a 1 gallon autoclave was charged with 1400 g of polymer solution containing the 200 g of polymer obtained in Reference Example 6, and the solution was heated and maintained at 80° C. with stirring at 500 rpm. Subsequently, 0.8 mmole of catalyst obtained in Reference Example 3 was added to the polymer solution. Then, dried hydrogen gas was fed into the autoclave at a pressure of 10 kg/cm² and the mixture was stirred for 3 hours to hydrogenate the polymer. The reaction solution was relieved of heat and pressure, removed from the autoclave, and diluted with a large volume of methanol to precipitate the polymer in the solution. The precipitated polymer was separated from the solution by filtration and dried. By the H-NMR analysis, the degree of hydrogenation of olefinic double bonds was 99.5% and no styrene unit was hydrogenated.

EXAMPLE 10

Hydrogenation of Living Polymer

Into a 1 gallon autoclave was charged with 1400 g of polymer solution containing the 200 g of polymer obtained in Reference Example 7, and the solution was heated and maintained at 80° C. with stirring at 500 rpm. Subsequently, 0.8 mmole of catalyst obtained in Reference Example 1 was added to the polymer solution. Then, dried hydrogen gas was fed into the autoclave at a pressure of 10 kg/cm² and the mixture was stirred for 3 hours to hydrogenate the polymer. The reaction solution was relieved of heat and pressure, removed from the autoclave, and diluted with a large volume of methanol to precipitate the polymer in the solution. The precipitated polymer was separated from the solution by filtration and dried. By the H-NMR analysis, the degree of hydrogenation of olefinic double bonds was 99.5% and no styrene unit was hydrogenated.

We claim:

1. A process for the hydrogenation of conjugated diene polymer in an inert organic solvent, said polymer being obtained by polymerization or copolymerization of a conjugated diene, which comprise effecting selective hydrogenation of unsaturated double bonds in the conjugated diene units of said conjugated diene polymer in the presence of catalyst represented by the following formula (I)

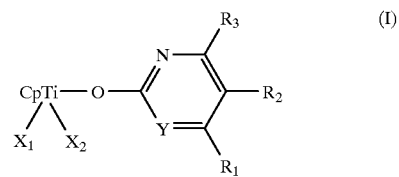

wherein

Cp is cyclopentadienyl ($C_5H_5$—);

$X_1$ and $X_2$ are each independently a hologen atom;

Y is carbon or nitrogen atom; and $R_1$, $R_2$ and $R_3$ are each independently hydrogen atom or $C_1$–$C_4$ lower alkyls.

2. The process for the hydrogenation of conjugated diene polymer according to claim 1, wherein the catalyst represented by the formula (I) is [Y:carbon atom, $R_1$ and $R_2$:hydrogen atom, and $R_3$:hydrogen atom or metyl] or [Y:nitrogen atom, $R_1$:hydrogen atom or methyl, $R_2$:hydrogen atom, and $R_3$:hydrogen atom or methyl].

3. The process for the hydrogenation of conjugated diene polymer according to claim 1, wherein said conjugated diene polymer is a polymer of 1,3-butadiene, isoprene, piperylene, phenylbutadiene, 3,4-dimethyl-,1,3-hexadiene, 4,5-diethyl-1,3-octadiene, styrene, 2-vinyl pyridine, 4-vinyl pyridine and vinyl naphthalene.

4. The process for the hydrogenation of conjugated diene polymer according to claim 1, wherein said hydrogenation is carried out at 0° C. to 150° C., under hydrogen pressure of 1 to 100 kg/cm².

5. The process for the hydrogenation of conjugated diene polymer according to claim 4, wherein said hydrogenation is carried out at 50° C. to 140° C., under hydrogen pressure of 2 to 30 kg/cm².

6. The process for the hydrogenation of conjugated diene polymer according to claim 1, wherein the amount of the catalyst is in the range of 0.05 to 5.0 mmole/100 g of the amount of the polymer.

7. The process for the hydrogenation of conjugated diene polymer according to claim 6, wherein the amount of the catalyst is in the range of 0.1 to 1.0 mmole/100 g of the amount of the polymer.

* * * * *